(12) United States Patent
Cho et al.

(10) Patent No.: US 9,407,895 B2
(45) Date of Patent: Aug. 2, 2016

(54) APPARATUS AND METHOD FOR CONTROLLING A VIDEO

(71) Applicant: Samsung Electronics Co. Ltd., Suwon-si, Gyeonggi-do (KR)

(72) Inventors: You-Kyung Cho, Suwon-si (KR); Soung-Kwan Kimn, Pyeongtaek-si (KR); Jong-Kyu Kim, Seoul (KR); Tae-Hyung Kim, Yongin-si (KR); Jung-Wook Chai, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 240 days.

(21) Appl. No.: 14/011,085

(22) Filed: Aug. 27, 2013

(65) Prior Publication Data

US 2014/0064695 A1   Mar. 6, 2014

(30) Foreign Application Priority Data

Aug. 29, 2012 (KR) ........................ 10-2012-0094654

(51) Int. Cl.
| | |
|---|---|
| *H04N 9/80* | (2006.01) |
| *H04N 9/87* | (2006.01) |
| *H04N 21/414* | (2011.01) |
| *H04N 21/63* | (2011.01) |
| *H04N 5/765* | (2006.01) |
| *H04N 5/783* | (2006.01) |

(52) U.S. Cl.
CPC ........... *H04N 9/87* (2013.01); *H04N 21/41407* (2013.01); *H04N 21/632* (2013.01); *H04N 5/765* (2013.01); *H04N 5/783* (2013.01)

(58) Field of Classification Search
CPC ..... H04N 5/85; H04N 9/8042; G11B 27/105; G11B 27/329; G11B 2220/2562
USPC ........................................................ 386/248
See application file for complete search history.

(56) References Cited

U.S. PATENT DOCUMENTS

2009/0313676 A1* 12/2009 Takeshima ........ H04L 29/06027
                                                                725/119

* cited by examiner

*Primary Examiner* — William C Vaughn, Jr.
*Assistant Examiner* — Daniel Tekle
(74) *Attorney, Agent, or Firm* — Jefferson IP Law, LLP

(57) ABSTRACT

A system for controlling a video is provided. The system includes a terminal which transmits a flush command to an external device to delete buffered data in a buffer of the external device when a search command for moving to a location of specific data of a video is generated while data of the video is streamed to the external device and which then transmits to the external device the specific data located in relation to the search command, and an external device which deletes the buffered data in the buffer when the flush command is received from the terminal while a video streamed from the terminal is reproduced and which buffers the specific data of the video received from the terminal in the buffer to be output.

33 Claims, 6 Drawing Sheets

US 9,407,895 B2

APPARATUS AND METHOD FOR CONTROLLING A VIDEO

PRIORITY

This application claims the benefit under 35 U.S.C. §119(a) of a Korean patent application filed on Aug. 29, 2012 in the Korean Intellectual Property Office and assigned Serial No. 10-2012-0094654, the entire disclosure of which is hereby incorporated by reference.

BACKGROUND OF THE INVENTION

1. Field of the Invention

The present invention relates to an apparatus and a method for controlling a video. More particularly, the present invention relates to an apparatus and a method for controlling a video in a terminal which may control a video being reproduced in an external device without a delay.

2. Description of the Related Art

A video stored in a terminal can be transmitted in real time to an external device, and the video may be output and reproduced. For example, a video stored in a terminal may be transmitted in real time to a television (TV) which is connected to the terminal and the TV may output and reproduce the video.

In particular, rather than transmitting the video to the external device connected to the terminal, a mirroring function may be performed in which the current terminal screen data itself is transmitted to the external device.

When the mirroring function is performed on the external device connected to the terminal (e.g. when the mirroring function is performed between the terminal and the external device connected thereto), the terminal captures a current screen of the terminal after the external device is connected thereto and adds PTS time to data corresponding to the captured current screen to be transmitted to the external device in real time. The PTS corresponds to a certain time value which increases after the terminal is connected to the external device.

If reproduction of a video is selected from the terminal while the terminal provides to the external device the data corresponding to the current screen, to which the PTS is added, the terminal reproduces the video based on a timestamp of the video and captures the current screen of the terminal which reproduces the video to be transmitted to the external device in real time.

According to the related art, when a search command occurs in the terminal, the terminal performs the search command based on the timestamp of the video. In contrast, the external device performs the search command based on the PTS. As a result, synchronization between the terminal and the external device is difficult. Therefore, a delay between the external device and the terminal occurs.

Therefore, a need exists for an apparatus and a method for controlling a video in a terminal which may control a video being reproduced in an external device without a delay.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for controlling a video in a terminal which may control a video being reproduced in an external device without a delay.

Another aspect of the present invention is to provide a control apparatus and a control method in which a terminal controls a buffer of an external device while the same video is reproduced in the terminal and the external device such that a control of the video being reproduced in the terminal may be performed in the external device without a delay.

Another aspect of the present invention is to provide a control apparatus and a control method in which a control of a video being reproduced in the terminal may be performed in an external device without a delay during when a mirroring function is performed in which the terminal which reproduces the video provides the screen data itself to the external device being connected in real time.

In accordance with another aspect of the present invention, a system for controlling a video is provided. The system for controlling a video includes a terminal which transmits a flush command to an external device to delete buffered data in a buffer of the external device when a search command for moving to a location of specific data of a video is generated while data of the video is streamed to the external device and which then transmits to the external device the specific data located in relation to the search command, and an external device which deletes the buffered data in the buffer when the flush command is received from the terminal while a video received from the terminal in streaming is reproduced, and which buffers the specific data of the video received from the terminal in the buffer to be output.

In accordance with another aspect of the present invention, an apparatus for controlling a video in a terminal is provided. The apparatus for controlling a video includes an input unit which receives a command for controlling an external device, and a streaming server which transmits a flush command to the external device to delete buffered data in a buffer of the external device when a search command for moving to a location of specific data of a video is generated while the terminal is connected to the external device and data of the video is streamed to the external device and which then transmits to the external device the specific data of the video located in relation to the search command.

In accordance with another aspect of the present invention, an apparatus for controlling a video in an external device is provided. The apparatus for controlling a video in an external device includes a streaming client which deletes buffered data in a buffer when a flush command is received from a terminal while the streaming client is connected to the terminal and reproduces a streamed video received from the terminal and which streams a video received from the terminal and buffers specific data of the video received from the terminal in the buffer, and a reproduction unit which outputs the specific data of the video buffered in the buffer to the external device.

In accordance with another aspect of the present invention, a method of controlling a video is provided. The method of controlling a video includes streaming, by a terminal, data of a video to an external device, when a search command for moving to a location of specific data of the video is generated while the data of the video is streamed to the external device, transmitting, by the terminal, a flush command to the external device to delete buffered data in a buffer of the external device, and when the external device receives the flush command from the terminal, deleting the buffered data in the buffer, and when the external device receives specific data of the video located in relation to the search command, buffering the specific data in the buffer to be output.

In accordance with another aspect of the present invention, a method of controlling a video in a terminal is provided. The method of controlling a video includes connecting, by the terminal, to an external device, transmitting data of the video to the connected external device in streaming, when a search command for moving to a location of specific data of the video is generated while the data of the video is transmitted to the external device, transmitting a flush command to the external device to delete buffered data in a buffer of the external device, and when the terminal receives a delete completion message from the external device, transmitting to the external device the specific data of the video located in relation to the search command.

In accordance with another aspect of the present invention, a method of controlling a video in an external device is provided. The method of controlling a video includes connecting, by the external device, to a terminal, reproducing, by the external device, a video streamed from the connected terminal, and when the external device receives a flush command from the terminal while the received video is reproduced, deleting buffered data in a buffer, buffering specific data received from the terminal in the buffer, and outputting the buffered specific data.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
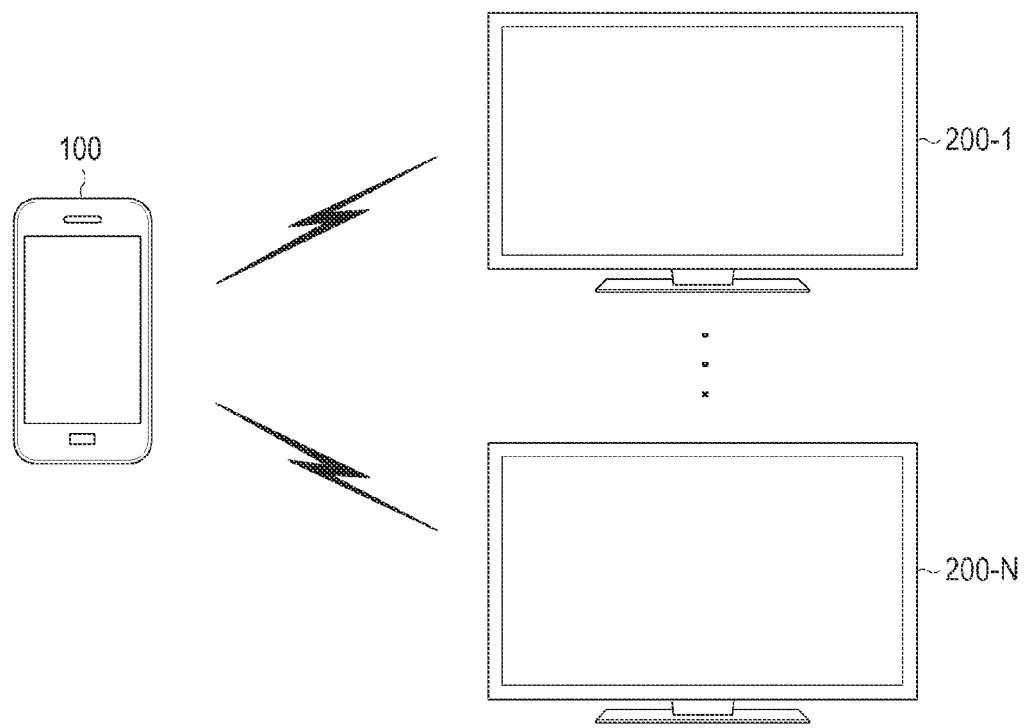
FIG. 1 is a view illustrating a connection between a terminal and a plurality of external devices according to an exemplary embodiment of the present invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A terminal according to an exemplary embodiment of the present invention includes a portable terminal and a stationary terminal. The portable terminal may be a mobile electronic device which is easy to carry and may be a video phone, a portable phone, a smart phone, an international mobile telecommunication 2000 (IMT-2000) terminal, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, an E-Book, a portable computer such as a laptop or a tablet, a digital camera, and the like. The stationary terminal may be a desktop personal computer, a gaming terminal (or console), and the like.

According to exemplary embodiments of the present invention, an external device includes any type of device such as a television (TV), a personal computer (PC), an external display device, and the like, which can be connected to the terminal to be capable of transmitting and receiving data and commands to/from the terminal and outputting image data (stationary image and video) received from the terminal.

According to exemplary embodiments of the present invention, the external device may include only a configuration (e.g., a display unit and a speaker) for outputting a data. In this case, the external device may be connected to a separate connection apparatus including a receiving unit for receiving data and a reproduction unit for reproducing data. Therefore, when the external device is connected to the connection apparatus and the connection apparatus is connected to the terminal, the connection apparatus receives data from the terminal through the receiving unit and performs reproduction of the data through the reproduction unit to be transmitted to the external device, and the external device may output data received from the terminal through the display unit and the speaker.

Figure 2A:
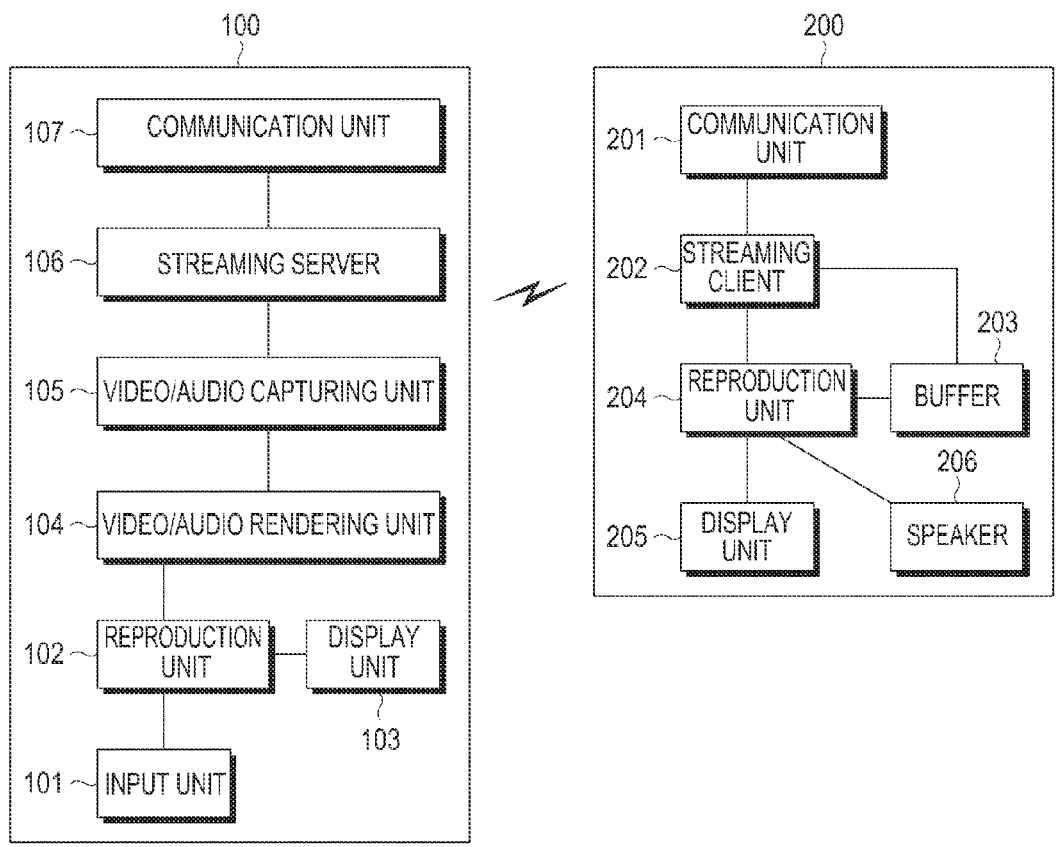
FIG. 2A is a configuration view of a terminal and an external device according to an exemplary embodiment of the present invention.
Figure 2B:
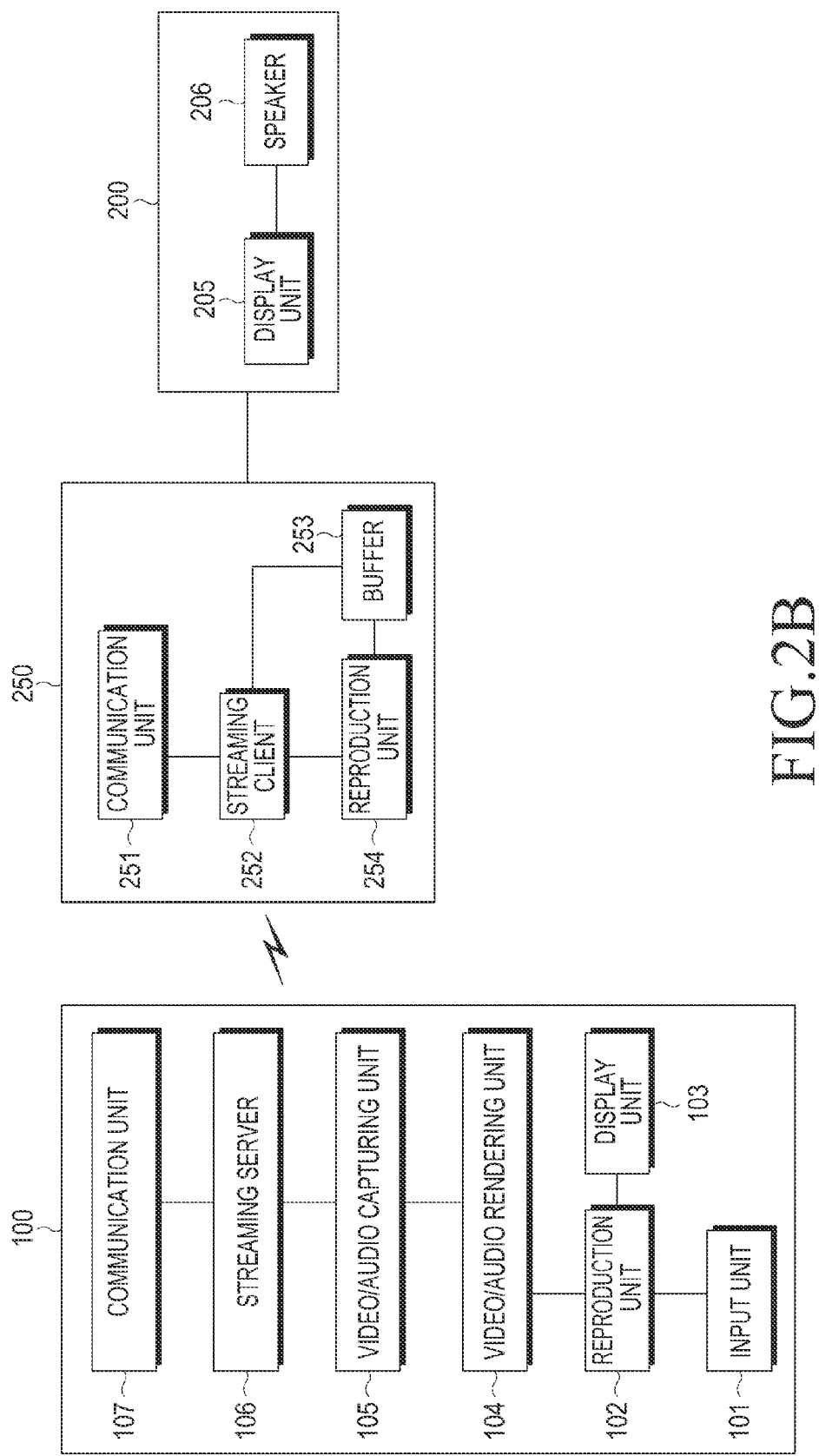
FIG. 2B is a configuration view of a terminal, a connection apparatus, and an external device according to an exemplary embodiment of the present invention.

FIG. 1 is a view illustrating a connection between a terminal and a plurality of external devices according to an exemplary embodiment of the present invention. FIG. 2A is a configuration view of a terminal and an external device according to an exemplary embodiment of the present invention. FIG. 2B is a configuration view of a terminal, a connection apparatus, and an external device according to an exemplary embodiment of the present invention.

Referring to FIG. 1, a terminal 100 may connected to a plurality of external devices 200. For example, the terminal 100 may be connected to at least one of the plurality of external devices 200 (e.g., 200-1 to 200-N) through Wi-Fi Peer-to-Peer (Wi-Fi P2P) or Wi-Fi direct communication without an Access Point (AP). The terminal 100 may be directly connected to the at least one of the plurality of external devices 200 (e.g., 200-1 to 200-N).

In a case of Wi-Fi P2P communication, 1:1 connection as well as 1:N connection are possible. Therefore, the terminal 100 equipped with a Wi-Fi P2P communication module may be connected to a plurality of external devices 200-1~200-N equipped with the Wi-Fi P2P communication module to provide a mirroring function in which screen data itself of the terminal 100 are transmitted to the plurality of the external devices 200-1~200-N in real time.

Referring to FIG. 2A, a configuration of the terminal 100 and a specific external device 200 among the plurality of external devices 200-1~2001-N will be described. The configuration of the specific external device 200 shown in FIG. 2A may be similar to the configuration of the plurality of external devices 200-1~2001-N.

The terminal 100 includes an input unit 101, a reproduction unit 102, a display unit 103, a video/audio rendering unit 104, a video/audio capturing unit 105, a synthesis unit (not shown), a streaming server 106, and a communication unit 107.

The input unit 101 includes keys for entering number and character information and function keys for setting various functions.

The input unit 101 receives a command for controlling the external device 200 and a command for controlling the video which is being reproduced by the external device 200.

When the reproduction of a video saved in a memory (not shown) of the terminal or downloaded is selected, the reproduction unit 102 reproduces the selected video based on the timestamp and outputs video data of the video to the display unit 103 and audio data of the video to a speaker (not shown) of the terminal. For example, the reproduction unit 102 reproduces the video based on the timestamp and, at the same time, outputs the video data to the display unit and the audio data to the speaker.

The video/audio rendering unit 104 renders video data corresponding to the current screen of the display unit 103 to be output to the external device 200 and renders audio data corresponding to the video data to be transmitted to the video/audio capturing unit 105. As an example, the current screen of the display unit 103 may be a standby screen, a screen for performing a specific function, a screen for reproducing a video, or the like.

The video/audio capturing unit 105 respectively captures the rendered video and audio data received from the video/audio rendering unit 104 to be transmitted to the synthesis unit.

The synthesis unit synthesizes the captured video data and audio data as a single data to be transmitted to the streaming server 106.

According to exemplary embodiments of the present invention, the streaming server 106 controls an overall operation of the terminal 100.

While the streaming server 106 is connected to the external device 200 through the communication unit 107, the streaming server 106 transmits the video data received from the synthesis unit to the external device 200 in streaming. When the search command for moving (e.g., advancing) to a location of specific data of the video occurs through the input unit 101 while the video is streamed to the external device 200, a flush command is transmitted to the external device 200 to delete buffered data in a buffer of the external device 200 and specific data of the video of which location is specified in the search command is transmitted to the external device through the communication unit 107.

When the search command is generated, the streaming server 106 transmits a flush reproducing command to the external device 200. Thereafter, when a delete completion message is received from the external device 200, the streaming server streams data of the video to the external device 200 from the specific data corresponding to the moved location according to the search command.

When the terminal 100 is in a pause state in which video data is not transmitted to the external device 200, the streaming server 106 transmits a flush pause command when the search command occurs in the terminal 100. Thereafter, when the delete completion message is received from the external device 200, only specific video data corresponding to the moved location according to the search command are transmitted to the external device 200 such that the specific data is displayed as the pause data in the external device 200.

According to exemplary embodiments of the present invention, the external device 200 may include a communication unit 201, a streaming client 202, a buffer 203, a reproduction unit 204, a display unit 205, and a speaker 206.

According to exemplary embodiments of the present invention, the communication unit 107 may correspond to a Wi-Fi P2P communication module which is directly connected to the communication unit 201 of the external device 200 and which transmits and receives data and commands between the terminal 100 and the external device 200.

According to exemplary embodiments of the present invention, the communication unit 201 may correspond to a Wi-Fi P2P communication module which is directly connected through the communication unit 107 of the terminal 100 and which transmits and receives data and commands between the external device 200 and the terminal 100.

According to exemplary embodiments of the present invention, the streaming client 202 may control an overall operation of the external device 200.

The streaming client 202 is connected to the terminal device 100 through the communication unit 201 and, upon receipt of the streamed video data from the terminal 100 while the streaming client 202 is connected to the terminal 100, the streaming client 202 buffers the video data sequentially to the buffer 203 such that the buffered data in the buffer 203 are sequentially output to the display unit 205 and the speaker 206, thereby reproducing the video received from the terminal device 100 in the external device 200.

When the flush command is received from the terminal 100 while the video is reproduced in the external device 200, all the buffered data in the buffer 203 is deleted, the specific video data received from the terminal 100 is buffered in the buffer 203, and the video data of the specific data buffered in the buffer 203 is synchronized to the audio data thereof through the reproduction unit 204 to be output to the display unit 205 and the speaker 206.

When the flush reproducing command is received from the terminal 100 through the communication unit 201, the streaming client 202 deletes the buffered data in the buffer 203 and transmits the delete completion message to the terminal 100. Thereafter, the terminal 100 sequentially buffers the video data, streamed from the specific data, in the buffer 203. After a predetermined period of time, the terminal 100 synchronizes the video data and the audio data of the buffered data in the buffer 203 through the reproduction unit 203 to be respectively output to the display unit 205 and the speaker 206.

The buffer 203 may be a jitter buffer. The data received from the terminal 100 through the communication unit 201 is buffered and the buffered data in the buffer 203 is respectively output to the display unit 205 and the speaker 206 through the reproduction unit 204 after a certain period of time.

The reproduction unit 204 synchronizes the video data and the audio data of the buffered data in the buffer 203 and respectively outputs the synchronized video data and audio data to the display unit 205 and the speaker 206.

When the external device 200 includes only the display unit 205 and the speaker 206 capable of outputting the video output, the external device 200 may output the video received from the terminal 100 through a separate connection apparatus.

Referring to FIG. 2B, the terminal 100 is directly connected to a separate connection apparatus 250 which is connected to the external device 200 in the Wi-Fi P2P communication so as to transmit and receive data and commands with the connection apparatus 250. The functions of elements of the terminal 100 are the same as those of the terminal 100 illustrated in FIG. 2A except that the terminal 100 is connected to the connection apparatus 250 to transmit and receive data and commands, and thus, the description thereof will be omitted.

The connection apparatus 250 includes a communication unit 251, a streaming client 252, a buffer 253, a reproduction unit 254, and a connection unit (not shown) that may be wire or wirelessly connected to the external device 200.

According to exemplary embodiments of the present invention, the communication unit 251 may be a Wi-Fi P2P communication module which is directly connected to the terminal 100 through the communication unit 107 to transmit and receive data and commands between the connection apparatus 250 and the terminal 100.

The streaming client 252 controls the overall operation of the connection apparatus 250. The streaming client 252 is connected to the terminal 100 through the communication unit 251, and upon receipt of the streamed video data from the terminal 100 while being connected to the terminal 100, the streaming client 252 sequentially buffers the video data to the buffer 253 and sequentially outputs the buffered data in the buffer 253 to the external device 200 to reproduce the video transmitted from the terminal 100 in the external device.

When the flush command is received from the terminal 100 while outputting the video received from the terminal 100 to the external device 200, all buffered data in the buffer 253 is deleted, specific data of the video received from the terminal 100 is buffered in the buffer 253, and the video data and the audio data of the specific data buffered in the buffer 253 are synchronized through the reproduction unit 253 to be output to the external device 200.

When the flush reproducing command of the flush command is received from the terminal 100 through the communication unit 251, the streaming client 252 deletes all buffered data in the buffer 253 and transmits the delete completion message to the terminal 100. Thereafter, the streaming client sequentially buffers the video data transmitted in streaming from the specific data in the terminal 100 and, after a predetermined period of time, synchronizes the video data and the audio data buffered in the buffer 253 through the reproduction unit 253 to be output to the external device 200.

The buffer 253 may be a jitter buffer. The data received from the terminal 100 through the communication unit 251 is buffered. After a predetermined period of time, the buffered data in the buffer 253 are reproduced through the reproduction unit 254 to be output to the external device 200.

The reproduction unit 254 synchronizes the video data and the audio data of the video buffered in the buffer 253 to be output to the external device 200.

The external device 200 includes the display unit 205, the speaker 206, and a connecting unit (not shown) which may be connected via a wire or wirelessly to the connection apparatus 250.

When the external device 200 is connected to the separate connection apparatus 250, the external device 200 may output and reproduce the video received through the connection apparatus 250 respectively to the display unit 205 and the speaker 206 or may display pause data on the display unit 205.

Figure 3:
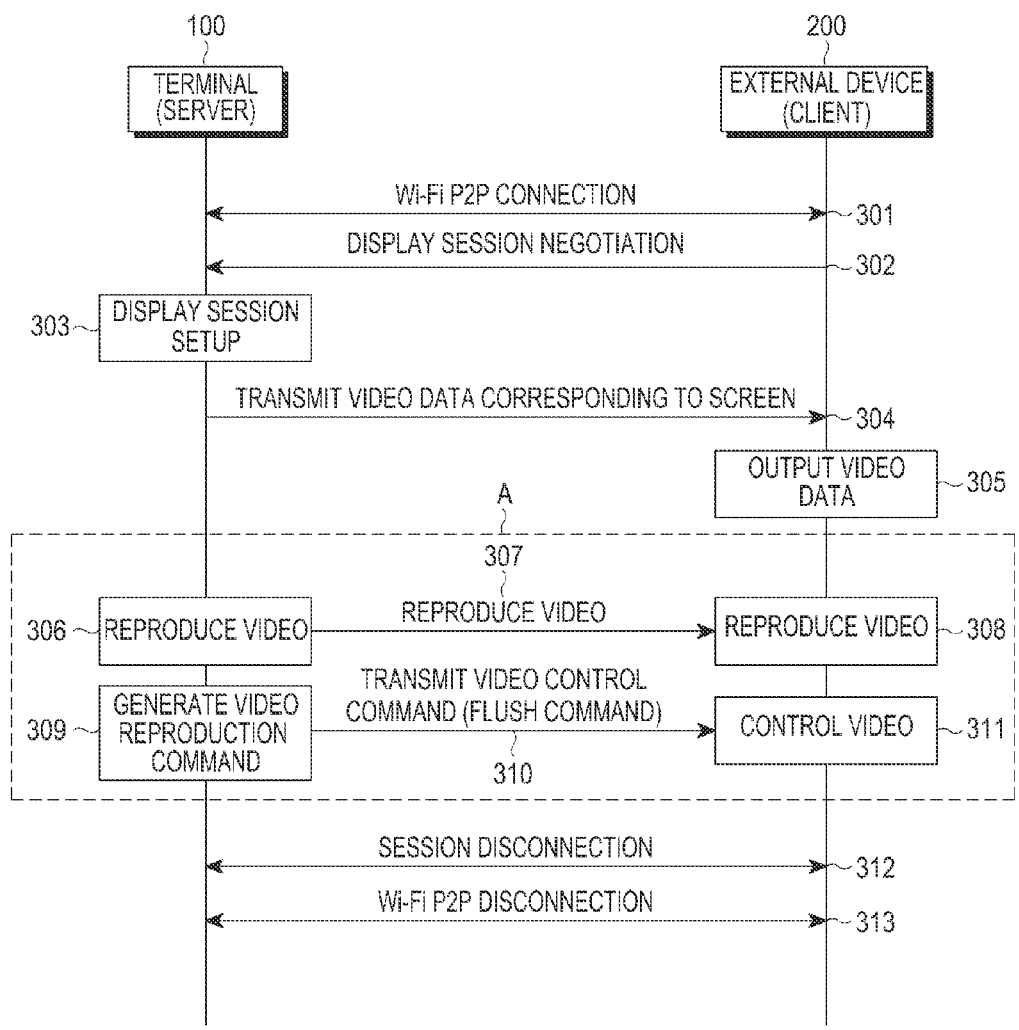
FIG. 3 is a flow chart illustrating a connection process between a terminal and an external device according to an exemplary embodiment of the present invention.
Figure 4:
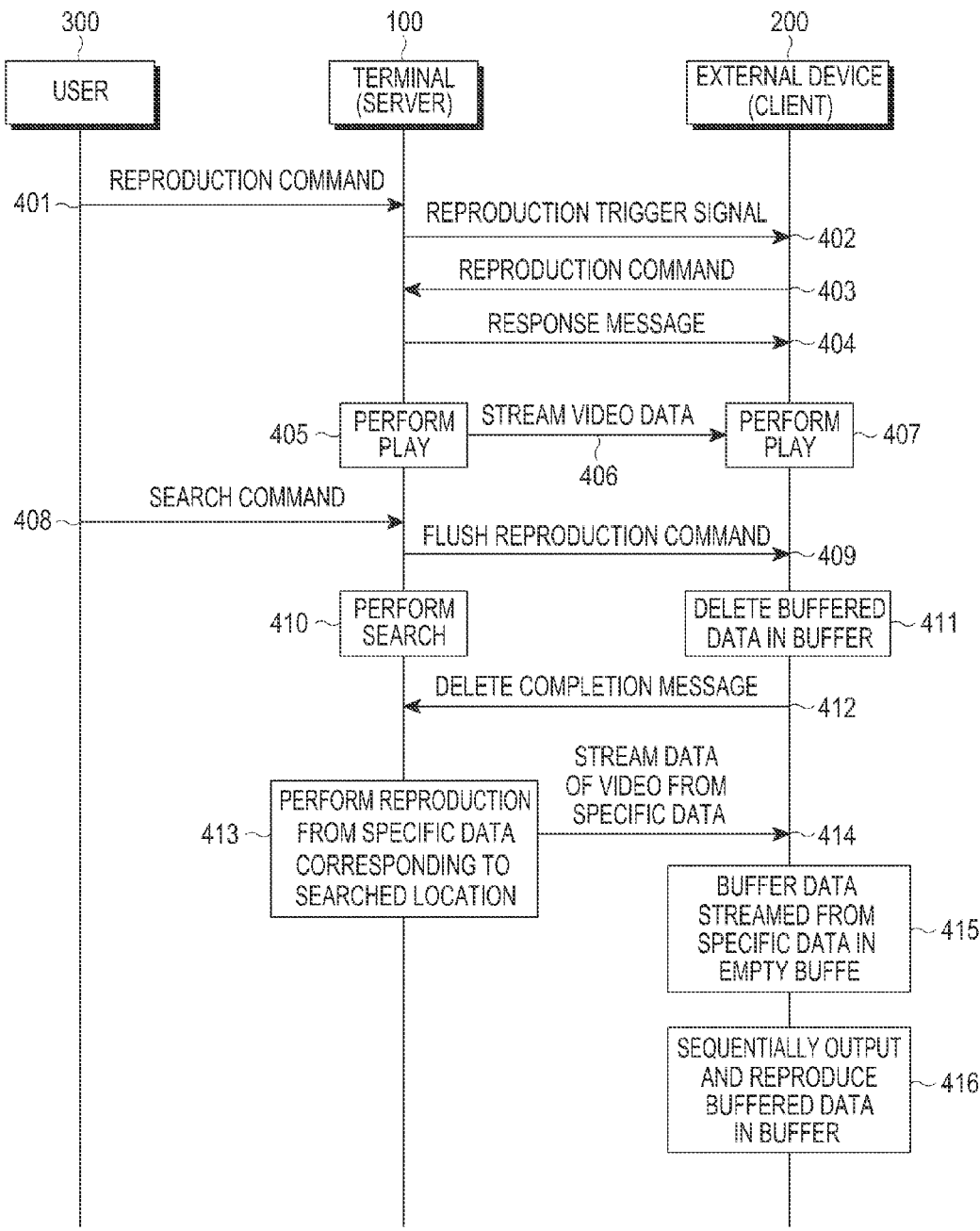
FIG. 4 is a flow chart illustrating a process of performing a search command between a terminal and an external device according to a first exemplary embodiment of the present invention.
Figure 5:
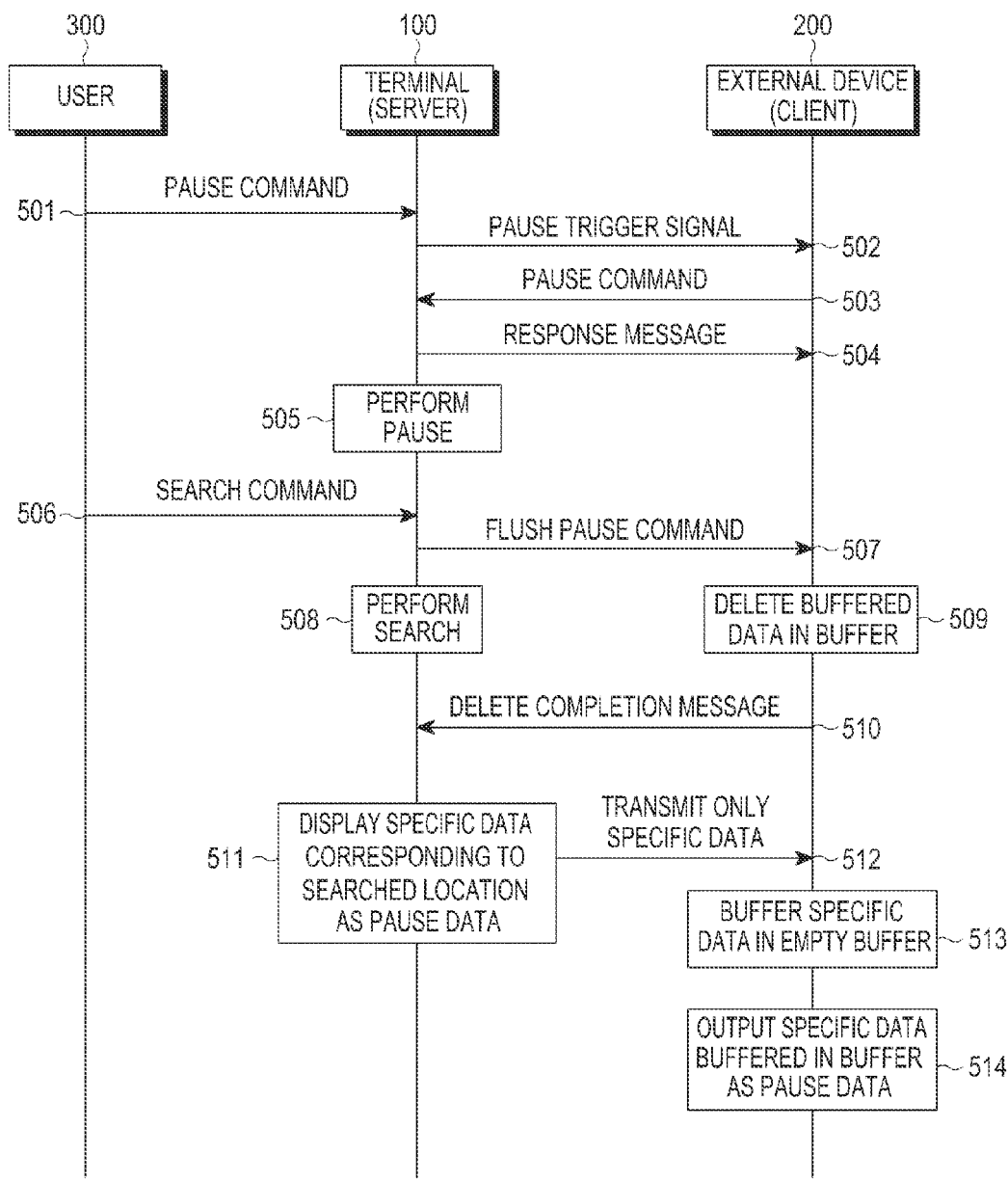
FIG. 5 is a flow chart illustrating a process of performing a search command between a terminal and an external device according to a second exemplary embodiment of the present invention.

FIG. 3 is a flow chart illustrating a connection process between a terminal and an external device according to an exemplary embodiment of the present invention. FIG. 4 is a flow chart illustrating a process of performing a search command between a terminal and an external device according to a first exemplary embodiment of the present invention. FIG. 5 is a flow chart illustrating a process of performing a search command between a terminal and an external device according to a second exemplary embodiment of the present invention.

Referring to FIGS. 3 to 5, an operation of controlling a video being reproduced by the external device in the terminal while the terminal device configured as shown in FIG. 2A and the external device are connected to each other will be described in detail.

In FIGS. 3 to 5, an example of a connection between the terminal and the external device as illustrated in FIG. 2A is described. However, when the terminal is connected to the external device through the separate connection apparatus as shown in FIG. 2B, a control operation of the video reproduced by the external device may be performed in the terminal in the same manner through the separate connection apparatus.

Referring to FIG. 3, in step 301, the terminal 100 and the external device 200 are connected to each other in the Wi-Fi P2P communication through the communication unit 107 of the terminal 100 and the communication unit 201 of the external device 200.

In step 302, the terminal 100 and the external device 200 perform a display session negotiation process through which the external device 200 transmits display resolution information and audio/video codec information used in the external device to the terminal 100.

Upon receipt of the display resolution information and the audio/video codec information used in the external device 200, the terminal 100 performs step 303 in which a display session setup is performed with respect to the external device 200.

In step 304, the terminal 100 transmits the video data corresponding to the current screen of the display unit 103 to the external device 200 in real time and the PTS time value is increased and added to the video data transmitted in real time to the external device 200.

In step 305, the external device 200 outputs the video data received from the terminal 100 on the display unit 205. For example, when corresponding audio data is received together with the video data in step 304, the external device 200 displays the video data on the display unit 205 and outputs the received audio data through the speaker 206.

While the terminal 100 transmits the video data corresponding to the current screen being displayed on the display unit 103 of the terminal 100 to the external device in real time, if reproduction of a video is selected by a user in the terminal 100, the terminal 100 reproduces the selected video based on the timestamp in step 306. At the same time, when the terminal 100 transmits the video being reproduced in the terminal device in step 307 to the external device 200, and the external device 200 proceeds to step 308 in which the video streamed from the terminal 100 is reproduced in the external device 200.

While the video reproduced in the terminal 100 is streamed to the external device 200 to be reproduced in the external device 200, when a control command for the video being reproduced is generated in the terminal 100 in step 309, the terminal 100 transmits the control command for the video to the external device 200 in step 310. The external device 200 performs step 311 in which the reproduced video is controlled according to the received control command for the video.

The control command of the video transmitted from the terminal 100 to the external device 200 includes commands such as pause, stop, fast forward, and rewind as well as a flush command (flush reproducing command or flush pause command) in accordance with generation of the search command.

A process of performing the search command between the terminal 100 and the external device while reproducing the video in steps 306 to 311 is described in detail with reference to FIGS. 4 and 5.

In step 312, the session connection between the terminal 100 and the external device 200 is disconnected.

When a session connection between the terminal 100 and the external device 200 is disconnected in step 312, step 313 is performed in which the Wi-Fi connection between the terminal 100 and the external device 200 is disconnected.

Referring to FIG. 4, when a reproduction command for the video is generated in the terminal 100 by a user 300 in step 401, the terminal 100 performs step 402 in which a reproduction trigger signal is transmitted to the external device 200 to request the reproduction command to be generated.

In step 403, the external device 200, which receives the reproduction trigger signal from the terminal 100, transmits the reproduction command to the terminal 100.

In step 404, the terminal 100, which receives the reproduction command from the external device 200, transmits a response message in relation to the reproduction command. The terminal transmits the response message to the external device 200.

In step 405, the terminal 100 performs reproduction of the video selected by the user. At the same time as reproducing the video selected by the user, the terminal 100 performs step 406 in which data of the video is streamed to the external device 200.

In step 407, the external device 200 sequentially buffers the data of the received video in the buffer 203 and, after a predetermined period of time, the video data and the audio data of the data are synchronized to be respectively output to the display unit 205 and the speaker 206 of the external device to reproduce the video.

The video data output to the display unit 205 of the external device is data represented on a screen of the terminal 100 which reproduces the video.

In step 408, when the search command is generated by the user 300 in the terminal 100 while the video is being reproduced in the terminal 100 and the external device 200 at the same time, the terminal 100 proceeds to step 409 in which the flush reproduction command is transmitted to the external device 200.

For example, while the video is reproduced in the terminal 100, a progress bar showing progress of the video reproduction may be displayed on the display unit of the terminal 100 and, when the user randomly moves the progress bar to a specific location, the search command may be generated.

In step 410, the terminal performs a search in accordance with the generated search command. In step 411, the external device 200, which receives the flush reproducing command, deletes data buffered in the buffer 203 (e.g., data that has not yet been output).

In step 412, the external device 200 transmits the delete completion message to the terminal 100 after the external device 200 has deleted all the buffered data from the buffer 203.

In step 413, the terminal 100, which receives the delete completion message from the external device 200, reproduces the data from the specific data of the video corresponding to a searched location according to the search command. At the same time as reproducing the data from the specific data of the video corresponding to a searched location according to the search command, in step 414 the terminal 100 transmits data of the video from the specific data in streaming.

In step 415, the external device 200 sequentially buffers, in the buffer 203, data of the video received from the specific data in streaming. In step 416, the external device 200 synchronizes and sequentially outputs the video data and the audio data of the data buffered in the buffer 203.

Referring to FIG. 5, when the video reproducing command is generated in the terminal 100 by the user 300, the terminal 100 transmits the reproduction trigger signal to the external device 200 to request generation of the reproduction command.

The external device 200, which receives the reproduction trigger signal from the terminal 100, transmits the reproduction command to the terminal 100 and the terminal 100, which receives the reproduction command from the external device 200, transmits the response message thereof. In addition, the terminal 100 performs reproduction of the video selected by the user and, at the same time, streams data of the video to the external device 200.

The external device 200 sequentially buffers data of the received video in the buffer 203 and, after a predetermined period of time, synchronizes the video data and the audio data of the data to be respectively output to the display unit 205 and the speaker 206 of the external device. The video data output to the display unit 205 of the external device is data representing a screen of the terminal 100 which reproduces the video.

In step 501, the user 300 generates a pause command that is input or otherwise transmitted to the terminal 100 while the terminal 100 and the external device 200 simultaneously reproduce the video.

While the terminal 100 and the external device 200 simultaneously reproduce the video, when a pause command for the video reproduced in the terminal 100 is generated by the user 300 in step 501, the terminal 100 performs step 502 in which a pause trigger signal is transmitted to the external device 200 to request the pause command to be generated.

In step 503, the external device 200, which receives the pause trigger signal from the terminal 100, transmits the pause command to the terminal 100. In step 504, the terminal 100, which receives the pause command from the external device 200, transmits the response message in response to the pause command.

In step 505, the terminal 100 performs a pause on the video being reproduced while not transmitting data of the video to the external device 200.

In step 506, when the terminal 100 and the external device 200 are in the pause state, the user 300 generates the search command and inputs or otherwise transmits the search command to the terminal 100. In step 507, the terminal 100 transmits the flush pause command to the external device 200.

For example, the progress bar showing the progress of the video reproduction may be displayed in the display unit of the terminal 100 while the video is reproduced in the terminal 100, and the search command may be generated when the user randomly moves the progress bar to a specific location.

In step 508, the terminal 100 performs the search in accordance with the generation of the search command. In step 509, the external device 200, which receives the flush pause command, deletes data buffered in the buffer 203 (e.g., all data that has not yet been output).

In step 510, the external device 200 transmits the delete completion message to the terminal 100 after deleting all the data buffered in the buffer 203.

In step 511, the terminal 100, which receives the delete completion message from the external device 200, outputs the specific data of the video corresponding to a location searched by the search command to the terminal display unit 103 as the pause data. At the same time as outputting the specific data of the video corresponding to a location searched by the search command to the terminal display unit 103 as the pause data, in step 512, the terminal 100 transmits only the specific data to the external device 200.

In step 513, the external device 200 sequentially buffers the specific data in the buffer 203. In step 514, the external device 200 outputs video data of the specific data buffered in the buffer 203 to the display unit 205 of the external device 200 as the pause data of the external device 200.

When the flush command (e.g., flush reproduction command or flush pause command) is received from the terminal 100, the external device 200 immediately deletes all buffered data in the buffer 203 and thereafter immediately buffers the data received from the terminal 100 in an empty buffer so that the video which is reproduced in the terminal 100 and the external device 200 may be simultaneously controlled without a delay.

An apparatus and a method for controlling a video according to the present invention may be implemented in a computer readable code stored on a non-transient computer readable recording medium. The non-transient computer readable recording medium include any type of recording medium that can store a data readable by a computer system. Examples of the non-transient computer readable recording medium include Read-Only Memory (ROM), Random Access Memory (RAM), optical disks, magnetic tapes, floppy disks, hard disks, and non-volatile memory, and also can be implemented in a carrier wave (e.g., transmission through Internet). The non-transient computer readable recording medium may be distributed in a network connected computer system so that the computer readable code is stored and executed in a distributed fashion.

According to exemplary embodiments of the present invention, an apparatus and a method for controlling a video are provided so that, when a video is provided to an external device connected to a terminal through a mirroring function, control of the video by the terminal may be performed in the external device without a delay.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A system for controlling a video, the system comprising:
a terminal configured to:
  stop streaming of data of a video to an external device and transmit a flush command to an external device to delete buffered data in a buffer of the external device when a command for moving to a location of specific data of the video is generated while data of the video is streamed to the external device, and
  transmit to the external device the specific data located in relation to the command; and
an external device configured to:
  buffer data of a video streamed from the terminal in a buffer,
  stop reproduction of buffered data in the buffer and delete the buffered data in a buffer when the flush command is received from the terminal while the buffered data in the buffer is reproduced, and
  buffer the specific data of the video received from the terminal in the buffer to be output.

2. The system of claim 1, wherein, after the terminal is connected to the external device, the terminal is further configured to stream a video reproduced in the terminal to the external device.

3. The system of claim 1,
wherein the external device is further configured to delete the buffered data in the buffer and transmits a delete completion message to the terminal, and
wherein the terminal is further configured to, when the terminal receives the delete completion message from the external device, transmit to the external device the specific data of the video located in relation to the command.

4. The system of claim 1, wherein the terminal is further configured to:
transmit a flush reproducing command to the external device, and
stream the data of the video from the specific data to the external device when the command is generated.

5. The system of claim 1, wherein the external device is further configured to, when the external device receives a flush reproducing command of the flush command from the terminal, delete the buffered data in the buffer and buffers data of the video, which are streamed from the terminal with a start of the specific data, in the buffer to be output.

6. The system of claim 1, wherein the terminal is further configured to, when the command is generated when the terminal is in a pause state in which the data of the video is not transmitted to the external device;
transmit a flush pause command of the flush command to the external device, and
transmit the specific data of the video, to be output as pause data in the external device, to the external device.

7. The system of claim 1, wherein the external device is further configured to, when the external device receives a flush pause command of the flush command:
delete the buffered data in the buffer,
buffer the specific data of the video received from the terminal, and
output the specific data to the external device as pause data.

8. The system of claim 1,
wherein the buffer of the external device is a jitter buffer,
wherein data received from the terminal is buffered in the buffer, and
wherein after a predetermined period of time, the buffered data in the buffer is output to a display unit of the external device.

9. A terminal comprising:
an input unit configured to receive a command for controlling an external device; and a processor configured to:
stop streaming of data of a video to the external device and transmit a flush command to the external device to delete buffered data in a buffer of the external device when a command for moving to a location of specific data of the video is generated while the terminal is connected to the external device and data of the video is streamed to the external device, and
transmit to the external device the specific data of the video located in relation to the command.

10. The terminal of claim 9,
wherein the processor is further configured to transmit a flush reproducing command to the external device when the command is generated, and
wherein the processor is further configured to, when the processor receives a delete completion message from the external device, stream the data of the video from the specific data to the external device.

11. The terminal of claim 9,
wherein the processor is further configured to, when the command is generated in a pause state in which the data of the video is not transmitted to the external device, transmit a flush pause command of the flush command to the external device, and
wherein the processor is further configured to, when the processor receives a delete completion message from the external device, transmit the specific data of to the external device to be output as pause data in the external device.

12. The terminal of claim 9, further comprising:
a communication unit configured to connect to the external device;
a reproduction unit configured to reproduce the video in the terminal;
a video/audio rendering unit configured to render video data corresponding to a screen of the terminal which reproduces the video and audio data corresponding to the video data;
a video/audio capturing unit configured to capture the rendered video data and audio data; and
a synthesis unit configured to synthesize the captured video data and the audio data to be transmitted to the processor.

13. The terminal of claim 12, wherein the rendered video data corresponds to screen data of the terminal which outputs the video.

14. An external device comprising:
processor configured to:
buffer data of a video streamed from a terminal in a buffer,
stop reproduction of buffered data in the buffer and delete buffered data in a buffer when a flush command is received from a terminal while the external device is connected to the terminal and the buffered data in the buffer is reproduced, and
buffer specific data of the video received from the terminal in the buffer; and
a display unit configured to output the specific data of the video buffered in the buffer to the external device.

15. The external device of claim 14,
wherein the processor is further configured to, when the processor receives a flush reproduction command from the terminal:
delete the buffered data in the buffer, transmits a delete completion message to the terminal, and
buffer the data of the video which is streamed from the specific data by the terminal in the buffer to be output to the external device.

16. The external device of claim 14,
wherein the processor is further configured to, when the processor receives a flush pause command from the terminal:
delete the buffered data in the buffer,
transmit a delete completion message to the terminal, and
buffer the specific data of the video transmitted from the terminal in the buffer to be output to the external device as pause data.

17. The external device of claim 14,
wherein the buffer is a jitter buffer,
wherein the buffer buffers data received from the terminal, and
wherein after a predetermined period of time, the data buffered in the buffer is output to the display unit of the external device.

18. A method of controlling a video, the method comprising:
when a command for moving to a location of specific data of a video is generated while the data of the video are streamed to the external device, stopping, by a terminal, streaming of data of a video to the external device and transmitting, by the terminal, a flush command to the external device to delete buffered data in a buffer of the external device; and
when receiving data of a video streamed from the terminal, buffering, by the external device, data of the video streamed from the terminal in a buffer, when the flush command is received from the terminal while the buffered data in the buffer is reproduced, deleting, by the external device, the buffered data in the buffer, and when receiving specific data of the video located in relation to the command from the terminal, buffering, by the external device, the specific data in the buffer to be output.

19. The method of claim 18, wherein the transmitting of the flush command comprises:
transmitting, by the terminal, a flush reproducing command when the command is generated while the terminal transmits the data of the video to the external device; and
transmitting, by the terminal, a flush pause command when the command is generated in a pause state in which the data of the video is not transmitted to the external device.

20. The method of claim 18, further comprising:
when the external device receives a flush reproducing command of the flush command from the terminal, deleting, by the external device, the buffered data in the buffer and transmitting a delete completion message to the terminal;
streaming, by the terminal, the data of the video from the specific data to the external device when the terminal receives the delete completion message; and
when the data of the video from the specific data is streamed, buffering, by the external device, the video in the buffer to be output to the external device.

21. The method of claim 18, further comprising:
when the external device receives a flush pause command of the flush command from the terminal, deleting, by the external device, the buffered data in the buffer and transmitting a delete completion message to the terminal;
transmitting, by the terminal, the specific data of the video to the external device when the terminal receives the delete completion message from the external device; and
buffering, by the external device, the specific data of the video in the buffer when the external device receives the specific data of the video and outputting the specific data to the external device as pause data.

22. The method of claim 18, wherein the buffer of the external device is a jitter buffer,
   wherein data received from the terminal is buffered in the buffer, and
   wherein after a predetermined period of time, the data buffered in the buffer is output to a display unit of the external device.

23. A method of controlling a video in a terminal, the method comprising:
   connecting to an external device;
   transmitting data of a video to the connected external device in streaming;
   when a command for moving to a location of specific data of the video is generated while the data of the video is transmitted to the external device, stopping streaming of data of a video to the external device and transmitting a flush command to the external device to delete buffered data in a buffer of the external device; and
   when receiving a delete completion message from the external device, transmitting to the external device the specific data of the video located in relation to the command.

24. The method of claim 23, wherein the transmitting of the flush command comprises:
   when the command is generated while the data of the video is transmitted to the external device, transmitting a flush reproduction command of the flush command to the external device; and
   when the command is generated in a pause state in which the data of the video is not transmitted to the external device, transmitting a flush pause command of the flush command to the external device.

25. The method of claim 23, wherein the transmitting the data of the video comprises:
   when the terminal receives the delete completion message from the external device after transmitting a flush reproduction command of the flush command is transmitted from the terminal to the external device, transmitting the data of the video from the specific data in streaming to the external device.

26. The method of claim 23, wherein the transmitting the data of the video comprises:
   when the terminal receives the delete completion message from the external device after transmitting a flush pause command is transmitted to the external device, transmitting the specific data of the video to the external device such that the specific data is output to the external device as pause data.

27. A method of controlling a video in an external device, the method comprising:
   connecting to a terminal;
   buffering data of a video streamed from the terminal in a buffer;
   reproducing the buffered data in a buffer; and
   when the external device receives a flush command from the terminal while the buffered data in the buffer is reproduced, deleting buffered data in a buffer, buffering specific data received from the terminal in the buffer, and outputting the buffered specific data.

28. The method of claim 27, wherein the outputting of the buffered specific data comprises:
   when the external device receives a flush reproduction command of the flush command, deleting the buffered data in the buffer and transmitting a delete completion message to the terminal; and
   when the external device receives data of the video with a start of the specific data in streaming from the terminal, buffering the data of the video in the buffer and outputting the buffered data.

29. The method of claim 27, wherein the outputting of the buffered specific data comprises:
   when the external device receives a flush pause command of the flush command from the terminal, deleting the buffered data in the buffer and transmitting a delete completion message to the terminal; and
   when the external device receives data from the specific data of the video from the terminal, buffering the specific data of the video in the buffer and outputting the buffered specific data.

30. The method of claim 27, wherein the buffer is a jitter buffer,
   wherein data received from the terminal is buffered in the buffer, and
   wherein after a predetermined period of time, the data buffered in the buffer is output to a display unit of the external device.

31. A non-transitory computer-readable storage medium storing instructions that when executed causes at least one processor to perform the method of claim 18.

32. A non-transitory computer-readable storage medium storing instructions that when executed causes at least one processor to perform the method of claim 23.

33. A non-transitory computer-readable storage medium storing instructions that when executed causes at least one processor to perform the method of claim 27.

* * * * *